United States Patent
Yeo et al.

(10) Patent No.: US 7,170,923 B2
(45) Date of Patent: Jan. 30, 2007

(54) APPARATUS AND METHOD FOR DETECTING DISCONTINUOUS TRANSMISSION PERIOD IN A CDMA MOBILE COMMUNICATION SYSTEM

(75) Inventors: Soo-Bok Yeo, Songnam-shi (KR); Sang-Min Bae, Kyonggi-do (KR); Ji-Won Ha, Seoul (KR); Jong-Han Kim, Yongin-shi (KR)

(73) Assignee: Samsung Electronics Co., Ltd., Suwon ( * ) Notice: Subject to any disclaimer, the term of this patent is extended or adjusted under 35 U.S.C. 154(b) by 717 days.

(21) Appl. No.: 10/338,714

(22) Filed: Jan. 9, 2003

(65) Prior Publication Data
US 2003/0128744 A1 Jul. 10, 2003

(30) Foreign Application Priority Data
Jan. 9, 2002 (KR) .................. 10-2002-0001239

(51) Int. Cl.
*H04B 1/69* (2006.01)
*H04B 7/00* (2006.01)
*H04B 7/216* (2006.01)

(52) U.S. Cl. .................. 375/147; 455/522; 370/335

(58) Field of Classification Search .......... 375/147, 375/316, 340; 455/522, 68, 69, 13.4; 370/335, 370/342, 441, 479
See application file for complete search history.

(56) References Cited

U.S. PATENT DOCUMENTS 6,438,119 B1 * 8/2002 Kim et al. .................. 370/335
6,654,613 B1 * 11/2003 Maeng et al. ............... 455/522

* cited by examiner

*Primary Examiner*—Khanh Tran
*Assistant Examiner*—Cicely Ware
(74) *Attorney, Agent, or Firm*—Roylance, Abrams, Berdo & Goodman, LLP (57) ABSTRACT

An apparatus for detecting a frame transmission period in a CDMA mobile communication system supporting a discontinuous transmission mode. A first frame detector performs primary frame detection by calculating a signal-to-interference ratio (SIR) using traffic symbol energy, pilot symbol energy and noise energy measured for a predetermined time period, and comparing the SIR with a predetermined frame detection threshold value. A decoder calculates a symbol error rate (SER) by decoding symbols received for the predetermined time period. A second frame detector selects an SER threshold value according to frame detection information from the first frame detector, and compares the selected SER threshold value with the SER to determine whether a frame has been transmitted.

20 Claims, 4 Drawing Sheets

APPARATUS AND METHOD FOR DETECTING DISCONTINUOUS TRANSMISSION PERIOD IN A CDMA MOBILE COMMUNICATION SYSTEM

PRIORITY

This application claims priority under 35 U.S.C. §119 to an application entitled "Apparatus and Method for Detecting Discontinuous Transmission Period in a CDMA Mobile Communication System" filed in the Korean Industrial Property Office on Jan. 9, 2002 and assigned Serial No. 2002-1239, the entire content of which is incorporated herein by reference.

BACKGROUND OF THE INVENTION

1. Field of the Invention

The present invention relates generally to an apparatus and method for detecting a non-transmission period in a discontinuous transmission mode of a data channel used in a Code Division Multiple Access (CDMA) mobile communication system. Specifically, the present invention relates to an apparatus for calculating a signal-to-interference ratio (SIR) using traffic symbol energy, pilot symbol energy and noise energy measured for a predetermined time period, and using a decoder to calculate a symbol error rate (SER) for use in accurately detecting a non-transmission period.

2. Description of the Related Art

Code Division Multiple Access (CDMA) mobile communication systems have evolved from an Interim Standard-95 (IS-95) specification for voice transmission, into an IS-2000 specification which includes high-speed data transmission as well as voice transmission. In the IS-2000 specification, the term "discontinuous transmission mode (DTX mode)" refers to a mode where data is transmitted by the frame only when transmission data is present. Such a discontinuous transmission mode contributes to a reduction in transmission power and signal noise strength, thereby increasing the entire capacity of the system.

However, in the case where a transmitter transmits data frames in a discontinuous transmission mode, if a mobile terminal fails to detect a non-transmission period, forward power control used in IS-2000 systems to increase the system capacity is not correctly performed, thus missing an advantage of the discontinuous transmission. In the forward power control used in IS-2000, a mobile terminal measures a signal-to-interference ratio (SIR) of a signal transmitted by a base station, and compares the measured SIR with a threshold value every 1.25 ms. As a result of the comparison, if the measured SIR is lower than or equal to the threshold value, the mobile terminal transmits to the base station a power control command for instructing the base station to increase transmission power. If the measured SIR is higher than the threshold value, the mobile station transmits to the base station a power control command for instructing the base station to decrease transmission power. Such a method of maintaining a proper received SIR by comparing the received SIR with a threshold value every 1.25 ms and transmitting a corresponding power control command is known by those skilled in the art as "inner loop power control".

In addition to the inner loop power control, the mobile terminal uses a method of analyzing the quality of a received data frame, and increasing a threshold value if the received data frame has a poor quality, or decreasing the threshold value if the received data frame has a good quality, to maintain a proper SIR. Such a method of maintaining a proper received SIR by controlling a threshold value is known by those skilled in the art as "outer loop power control".

In a discontinuous transmission mode, if a mobile terminal fails to detect a non-transmission period of data, the mobile terminal will mistake a non-transmitted frame for a received frame having a low quality, and thus increase a threshold value to be compared with a received SIR. Subsequently, in a data transmission period, the mobile terminal compares the received SIR with the increased threshold value, and transmits a corresponding power control command. As a result, the mobile terminal requests the base station to further increase transmission power. A signal detection method may be applied in such cases, however, it is not possible to apply a general signal detection method to a system with a low SIR, such as the CDMA mobile communication system. The general signal detection method, a technique for measuring energy of a signal and comparing the measured energy with a threshold value, is available only where a channel condition is rarely changed and only Gaussian noise is present, or where a received SIR is high. However, in a mobile communication environment, where changes in the channel condition are significant due to fading and received SIR values which are not high, it is not possible to use general signal detection methods that do not consider changes in channel conditions.

In order to cope with such a problem, the existing IS-2000 uses a power control symbol, which exists even in a non-transmission period, as a reference signal to detect a non-transmission period of a dedicated control channel (DCCH). That is, in the discontinuous transmission mode, the IS-2000 DCCH transmits, even during a non-transmission period, a power control symbol having the same power level as seen during a transmission period, for power control of a mobile terminal. Therefore, by calculating a ratio of the energy level of a power control symbol to the energy level of the other symbols within one frame, it is possible to easily detect a transmission period and a non-transmission period. In order to describe the existing method for detecting a discontinuous transmission period of DCCH, a structure of a typical apparatus for detecting a non-transmission period of DCCH is illustrated in FIG. 1.

Figure 1:
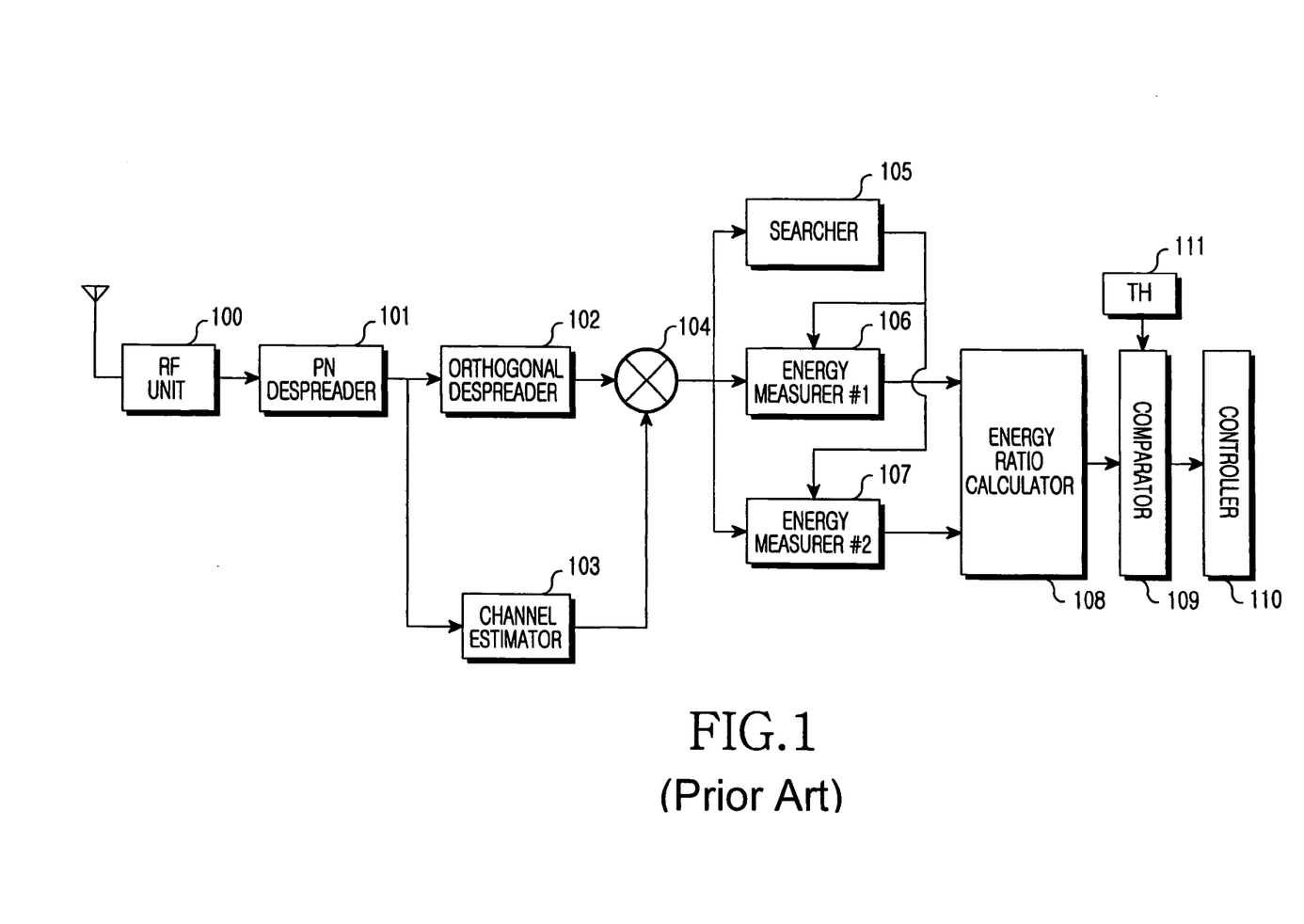
FIG. 1 is a block diagram illustrating an example of a known apparatus for detecting a non-transmission period of a dedicated control channel (DCCH) in a conventional Code Division Multiple Access (CDMA) mobile communication system.

FIG. 1 is a block diagram that illustrates an example of a known apparatus for detecting a non-transmission period of DCCH in a conventional CDMA mobile communication system. Referring to FIG. 1, a radio frequency (RF) unit 100 down-converts a received RF signal into the baseband signal, and a pseudo-random noise (PN) despreader 101 despreads the baseband signal with a PN code. An orthogonal despreader 102 despreads the PN-despread signal with an orthogonal code and generates a traffic symbol. A channel estimator 103 estimates channel distortion, consisting mainly of phase distortion, generated while the PN-despread signal passes through a radio channel environment. A mixer 104 then compensates the traffic channel phase using the estimation value.

Therefore, if a searcher 105 of the apparatus in FIG. 1 searches a position having the strongest energy, a first energy measurer 106 measures energy by accumulating energy of traffic symbols excluding power control symbols, by using the phase-compensated signal at the searched position on a frame-by-frame basis. A second energy measurer 107 measures energy of the power control symbol by using the phase-compensated signal at the searched position on a frame-by-frame basis. The measured energies are provided to an energy ratio calculator 108. The energy ratio calculator 108 calculates a ratio of the measured energies, and a comparator 109 compares the calculated energy ratio with a predetermined threshold value, and provides the result to a controller 110. Based on the comparison result, the controller 110 determines whether the DCCH is executing a frame transmission or not, i.e., whether a current period is a transmission period or non-transmission period of data.

However, unlike the DCCH, a supplemental channel (SCH) for use in transmitting high-speed data does not use a power control symbol that can be evaluated in a non-transmission period when the discontinuous transmission mode is applied. Therefore, the SCH cannot use the above-stated method for detecting a non-transmission period of the DCCH.

Accordingly, a need exists for an apparatus and method for detecting a non-transmission period in a discontinuous transmission mode of a data channel used in a Code Division Multiple Access (CDMA) mobile communication system.

SUMMARY OF THE INVENTION

It is, therefore, an object of the present invention to provide an apparatus and method for performing a first detection by measuring a signal-to-interference ratio (SIR), and performing a second detection on the first detected frame using a symbol error rate (SER) of a channel decoder.

It is another object of the present invention to provide an apparatus and method for detecting a non-transmission period at a mobile terminal when a base station performs discontinuous transmission on a data channel in a Code Division Multiple Access (CDMA) mobile communication system.

These and other objects are substantially achieved by providing an apparatus and method for detecting a frame transmission period in a CDMA mobile communication system supporting a discontinuous transmission mode. The apparatus and method employ a first frame detector for performing primary frame detection by calculating a signal-to-interference ratio (SIR) using traffic symbol energy, pilot symbol energy and noise energy measured for a predetermined time period, and comparing the calculated SIR with a predetermined frame detection threshold value. The apparatus and method also employ a decoder for calculating a symbol error rate (SER) by decoding symbols received for the predetermined time period. The apparatus and method further employ a second frame detector for determining an SER threshold value according to frame detection information from the first frame detector, and comparing the determined SER threshold value with the calculated SER to determine whether a frame has been transmitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Certain embodiments of the present invention are described below with reference to the accompanying drawings. In the following description, well-known functions or constructions known to those skilled in the art are not described in detail for conciseness.

Figure 2:
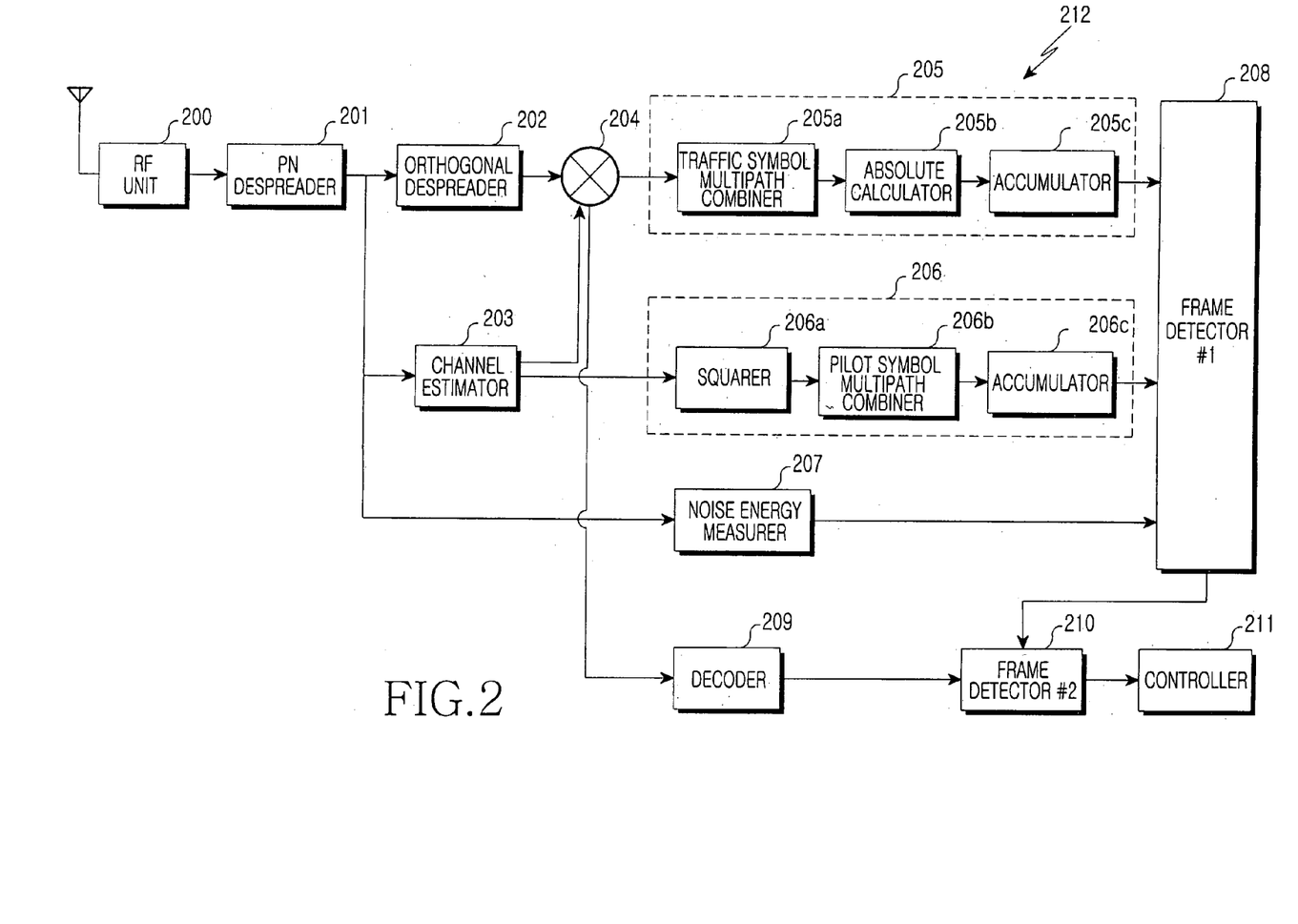
FIG. 2 is a block diagram illustrating an example of a receiver in accordance with an embodiment of the present invention.

FIG. 2 is a block diagram illustrating an example of a receiver in accordance with an embodiment of the present invention. As shown in FIG. 2, the receiver includes two frame detectors 208 and 210 which are used to detect a data transmission frame. The first frame detector 208 detects a frame primarily using traffic symbol energy, pilot symbol energy and noise (or interference) energy. The second frame detector 210 then determines whether a frame actually exists, using frame detection information output from the first frame detector 208 and symbol error information output from a decoder 209.

More specifically, the receiver of FIG. 2 includes an RF unit 200 that performs frequency down conversion on a received RF signal, and outputs a baseband signal. A PN despreader 201 despreads the baseband signal output from the RF unit 200 with a PN code. An orthogonal despreader 202 orthogonal-despreads the PN-despread signal with an orthogonal code assigned to a data channel, and accumulates the orthogonal-despread signal by the symbol to generate a demodulation symbol. A channel estimator 203 generates a channel estimation signal from the PN-despread signal, and a mixer 204 compensates a phase of a traffic channel for the orthogonal-despread signal using the channel estimation signal. Traffic energy necessary for first frame detection on the phase-compensated signal is measured by a traffic symbol energy measurer 205. The traffic symbol energy measurer 205 includes a traffic symbol multipath combiner 205a, an absolute calculator 205b, and an accumulator 205c. The traffic symbol multipath combiner 205a combines traffic symbols received from multiple paths at a symbol boundary detected by a searcher (not shown) for searching the multiple paths and a finger (not shown). The absolute calculator 205b calculates traffic symbol energy using the sum of absolute values of an in-phase component (I) and a quadrature component (Q) of the combined multipath symbol. The accumulator 205c accumulates an output of the absolute calculator 205b for a predetermined time T1, and provides the accumulated value to the first frame detector 208.

The channel estimation signal from the channel estimator 203 becomes the product of a fading component and a pilot signal of a channel. Therefore, the channel estimation signal can be referred to simply as a "pilot signal." A pilot symbol energy measurer 206 is used for calculating energy of a pilot channel using the pilot signal, and includes a squarer 206a, a pilot symbol multipath combiner 206b, and an accumulator 206c. The squarer 206a calculates pilot symbol energy by taking the sum of squares of an in-phase component and a quadrature-phase component of a pilot signal of one symbol. The measured multipath pilot energies are combined by the pilot symbol multipath combiner 206b, accumulated by the pilot symbol accumulator 206c for a predetermined time T1, and then provided to the first frame detector 208. A noise energy measurer 207 measures the noise energy by accumulating energy of a noise signal mixed with the PN-despread signal for a predetermined time T1, and provides the measured noise energy to the first frame detector 208.

The first frame detector 208 of FIG. 2 calculates a discontinuous transmission value (DTX_VALUE) for frame detection, which is an SIR calculated using the measured traffic symbol energy, pilot symbol energy and noise energy, and compares the DTX_VALUE with a predetermined frame detection threshold value. If the DTX_VALUE is larger than the frame detection threshold value, the first frame detector 208 determines a "primary" frame presence (i.e., a transmission period). However, if the DTX_VALUE is not larger than the frame detection threshold, the first frame detector 208 determines a "primary" frame absence (i.e., a non-transmission period).

The embodiment of the present invention shown in FIG. 2, then determines presence or absence of a frame by determining "secondary" presence or absence of a frame using a symbol error rate (SER) along with the "primary" frame detection described above. This "secondary" determination operation is performed by the decoder 209 and the second frame detector 210. The decoder 209 decodes the received symbols combined by the traffic symbol multipath combiner 205a for a predetermined time T1, calculates the number of symbol errors by encoding the decoded symbols to determine presence of errors, and then provides the result to the second frame detector 210.

Figure 3:
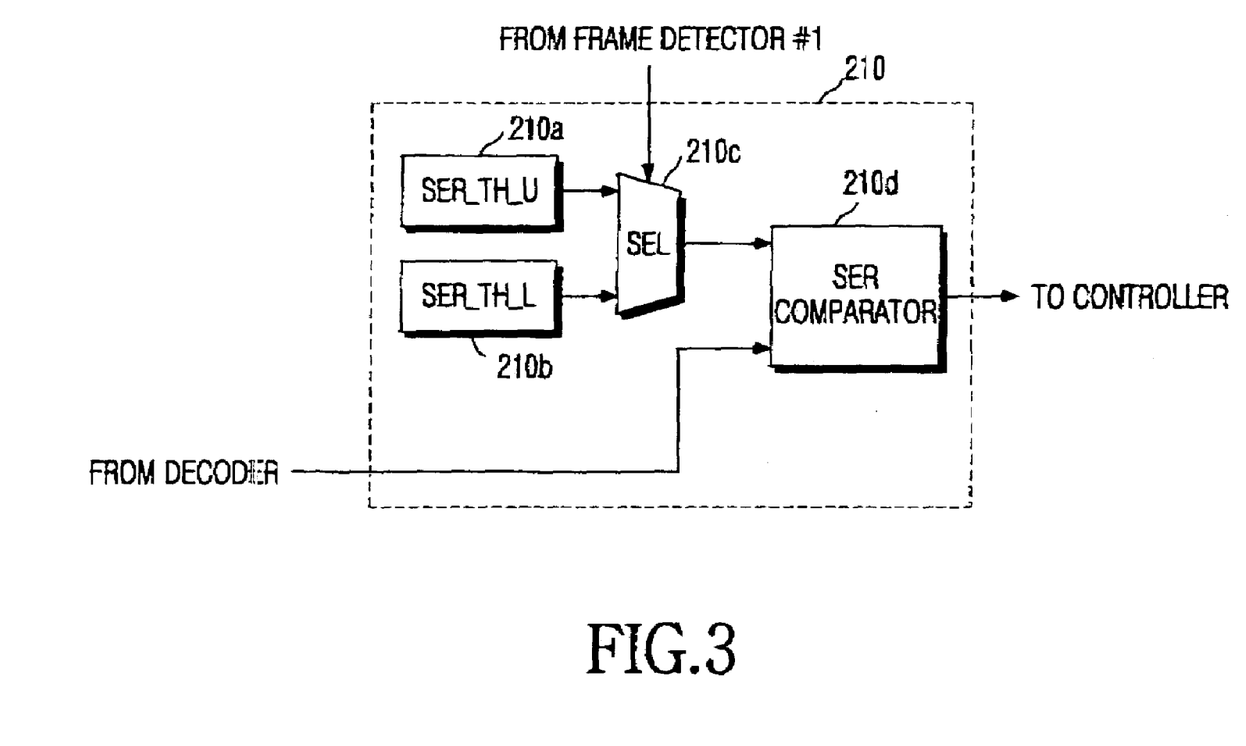
FIG. 3 is a block diagram illustrating an example of a second frame detector illustrated in FIG. 2.

A detailed structure of the second frame detector 210 is illustrated in FIG. 3. FIG. 3 is a block diagram illustrating an example of a second frame detector illustrated in FIG. 2. Referring to FIG. 3, the second frame detector 210 is comprised of an SER threshold value selector (SEL) 210c and an SER comparator 210d. The SER threshold value selector 210c selects (or decides) an SER threshold value according to the detection result of the first frame detector 208. The SER comparator 210d compares the number of symbol errors from the decoder 209 with the selected SER threshold SER_TH_L or SEL_TH_U, 210b or 210a respectively, and provides the final frame detection result to a controller 211.

The method of the embodiment described above, can detect a frame even from a data channel that does not use a reference signal, and improves detection performance by using the two detectors 208 and 210 even when a received signal underwent severe fading. Operations of the first and second detectors 208 and 210 will now be described in detail with reference to FIGS. 2 through 4.

Referring first to FIG. 2, the first frame detector 208 uses the measured traffic symbol energy, pilot symbol energy and noise energy, for frame detection. The measured energies are calculated by the first frame detector 208 as a DTX_VALUE for determining the presence or absence of a frame. The calculated DTX_VALUE is compared with a predetermined frame detection threshold value. If the calculated DTX_VALUE is not larger than the frame detection threshold value, the first frame detector 208 determines that no frame is being transmitted. The frame detection threshold value is related to a data rate of a traffic channel, and generally, the frame detection threshold has higher value as the data rate increases.

The traffic symbol energy necessary for the first frame detection is measured in the following way. If the PN despreader 201 PN-despreads a baseband signal output from the RF unit 200, the orthogonal despreader 202 despreads the PN-despread signal with an orthogonal code assigned to a traffic channel and accumulates the orthogonal-despread signal, for symbol demodulation. In the IS-2000 system, a Walsh code is typically used for the orthogonal code. An output of the orthogonal despreader 202 is then mixed by the mixer 204 with a channel estimation signal from the channel estimator 203 for phase compensation of a fading channel, thereby generating a channel-compensated signal.

The channel-compensated signal is then combined with symbols dispersedly received through other multiple paths by the traffic symbol multipath combiner 205a in the traffic symbol energy measurer 205, thus generating one traffic symbol. Since the combined symbol was phase-compensated, it is possible to calculate a square of the traffic symbol energy by adding an absolute value of an in-phase component and an absolute value of a quadrature-phase component of the combined symbol. The absolute calculator 205b calculates a square root of the calculated square of the traffic symbol energy, and the accumulator 205c accumulates an output of the absolute calculator 205b for a predetermined time T1. The accumulator 205c then provides the accumulated value to the first frame detector 208 as traffic symbol energy.

The pilot symbol energy necessary for the first frame detection is calculated by separately squaring an in-phase component and a quadrature-phase component of a signal output from the channel estimator 203 by the squarer 206a in the pilot symbol energy measurer 206 of FIG. 2, and then summing the squared values. In addition, as with the traffic symbol multipath combiner 205a, the pilot symbol multipath combiner 206b calculates pilot symbol energy by taking the sum of energies of the symbols dispersedly received through other multiple paths. The accumulator 206c accumulates the calculated pilot symbol energy for a predetermined time T1, and provides the accumulated value to the first frame detector 208.

Generally, a pilot energy accumulation period being set to T1 must be identical to a traffic energy symbol accumulation period. However, since the CDMA mobile communication system transmits a pilot having a predetermined channel gain, it is possible to measure the strength of the pilot, even though the accumulation period is short. Therefore, the pilot energy accumulation period can be different from the traffic energy symbol accumulation period T1. Finally, noise energy mixed with the received signal is also accumulated by the noise energy measurer 207 for a predetermined time T1, and then provided to the first frame detector 208.

The first frame detector 208 of FIG. 2, then calculates an SIR of the received signal, using the measured traffic symbol energy, pilot symbol energy and noise energy, and compares the calculated SIR with a predetermined frame detection threshold. Expressing the above procedure as an equation, a square root value of the traffic symbol energy, specifically, the output from the traffic symbol energy measurer 205, can be represented by equation (1) below.

$$\sqrt{E_{symbol}} = \sum_{T1} \left( |RX^I_{symbol}(t)| + |RX^Q_{symbol}(t)| \right) \quad (1)$$

$$RX_{symbol}(t) = \sum_{finger} \left( \alpha^2 \cdot \sqrt{E_p} \cdot \sqrt{E_t} \, (S^I_{symbol}(t) + jS^Q_{symbol}(t)) + \alpha^* \sqrt{E_p} \cdot n \right)$$

In equation (1), $\alpha$ is a fading component of a channel having a complex value, $\sqrt{E_p}$ is an estimation value of a pilot channel gain, $\sqrt{E_t}$ is an estimation value of a traffic channel gain, n is a noise signal having a complex value, $S_{symbol}^I$ is an in-phase component of a received symbol, $S_{symbol}^Q$ is a quadrature-phase component of a received symbol, and $$\sum_{finger}$$

represents accumulation for a time period where a complex finger searches a multipath signal.

In addition, a square root value of the pilot symbol energy, specifically, the output from the pilot symbol energy measurer 206, can be represented by equation (2) below.

$$E_{pilot} = \sum_{TI} \sum_{finger} \alpha^2 \cdot E_p \qquad (2)$$

The noise power mixed with the received signal can be represented by equation (3) below.

$$E_{noise} = \sum_{TI} \sum_{finger} n^2 \qquad (3)$$

The first frame detector 208 then calculates, in accordance with equation (4) below, a signal-to-interference ratio DTX_VALUE, specifically, a value for detecting a received frame, using the energies calculated by equations (1), (2) and (3) above.

$$\text{DTX\_VALUE} = \frac{E_{symbol}}{E_{noise}} \cdot \frac{\beta}{E_{pilot}} \qquad (4)$$

In equation (4), a constant β is a gain coefficient for compensating for a level difference between pilot channel gains for base stations.

If the calculated DTX_VALUE is larger than a predetermined frame detection threshold value, the first frame detector 208 determines the presence of a data frame i.e. "primary" detection. If the calculated DTX_VALUE is not larger than the predetermined frame detection threshold value, the first frame detector 208 determines the absence of a data frame. Presence of a data frame indicates that a corresponding period T1 is a data transmission period, and absence of a data frame indicates that the corresponding period T1 is a data non-transmission period. Such determined first frame detection information is then provided to the second frame detector 210.

The frame detection threshold value is set to a value determined when a traffic channel gain in equation (4) is 0. That is, the frame detection threshold value can be represented by equation (5) below.

$$\text{TH} = \text{DTX\_VALUE}|_{\sqrt{E_s}=0} = \text{Frame Detection Threshold} \qquad (5)$$

Ideally, the frame detection threshold value is optimized by statistically acquiring a distribution and relying upon a false alarm percentage. A false alarm is generated when a receiver misjudges that a data frame is received, even though a transmitter has not transmitted a data frame. The "false alarm percentage" is a percentage parameter set to determine presence or absence of data when a channel condition is so poor that it is not possible to determine whether a data frame exists or not. If the false alarm percentage is high, there is a high probability that the receiver will detect a data frame. In this case, however, there is also a high probability that the receiver will misjudge that there exists a frame even though there actually exists no frame. In contrast, if the false alarm percentage is low, there is a high probability that the receiver will misjudge that no frame exists even though a data frame actually exists. Therefore, in the case where a data frame has been transmitted but channel condition is so poor that the energy of a signal is attenuated, it is possible to decrease a frame detection error by setting the false alarm percentage to a large value even though the measured DTX_VALUE is small. If the channel condition is good, i.e., if it can be assumed that the channel is an Additive White Gaussian Noise (AWGN) channel, it is possible to decrease the frame detection error by setting the false alarm percentage to a small value. However, although it is expected that a channel condition is always poor since it is generally difficult to estimate an actual channel condition, it is preferable to set the false alarm percentage to a small value in order to reduce a detection error.

As stated above, it is possible to detect a frame with only the first frame detector 208, i.e. "primary" detection. However, if power control is performed in a fading environment such as the IS-2000 system, the power of a received signal is maintained on a level similar to the power of a noise signal. In this situation, if only the first frame detection is used, it is difficult to distinguish where the DTX_VALUE indicates the presence of a frame from where the DTX_VALUE indicates the absence of a frame, thereby causing a detection error. This results in improper power control of a received frame, which unnecessarily increases transmission power of a base station, decreasing system performance. In order to prevent this, the embodiment of the present invention described above improves frame detection performance through second frame detection using an SER.

Referring again to FIG. 3, the second frame detector 210 determines an SER threshold value based on the frame detection information from the first frame detector 208, and compares an SER (i.e., the number of symbol errors) from the decoder 209, with the determined SER threshold value, to determine whether a frame is detected. A detailed description of a frame detection process by the second frame detector 210 is made below.

The SER selector 210c in the second frame detector 210 of FIG. 3, first analyzes frame detection information by the first frame detector 208. As a result of the analysis on the frame detection information, if it is determined that there exists no frame, the SER selector 210c selects SER_TH_L, 210b from the predetermined two SER threshold values. If it is determined that there exists a frame, the SER selector 210c selects SER_TH_U, 210a. Here, SER_TH_L, 210b is smaller than SER_TH_U, 210a. Therefore, if the first frame detector 208 determines the absence of a frame, the SER comparator 210d compares the SER determined by the decoder 209 with the lower SER threshold SER_TH_L, 210b from the two SER threshold values, judging that there is a low probability that a frame would actually be transmitted. If the SER is lower than the SER_TH_L, 210b, the SER comparator 210d determines that although a frame has been actually transmitted, a poor frame was generated due to a poor channel condition. The SER comparator 210d does determine a frame transmission period occurred (i.e., determines that a current period is a frame transmission period).

If the first frame detector 208 determines the presence of a frame, the SER comparator 210d compares the SER with the higher SER threshold SER_TH_U, 210a, judging that there is a high probability that a frame would be actually transmitted. Here, if the SER is lower than the SER_TH_U, 210a, the SER comparator 210d determines that although a frame has been actually transmitted, a poor frame was generated due to a poor channel condition. That is, the SER comparator 210d determines a frame transmission period occurred.

Figure 4:
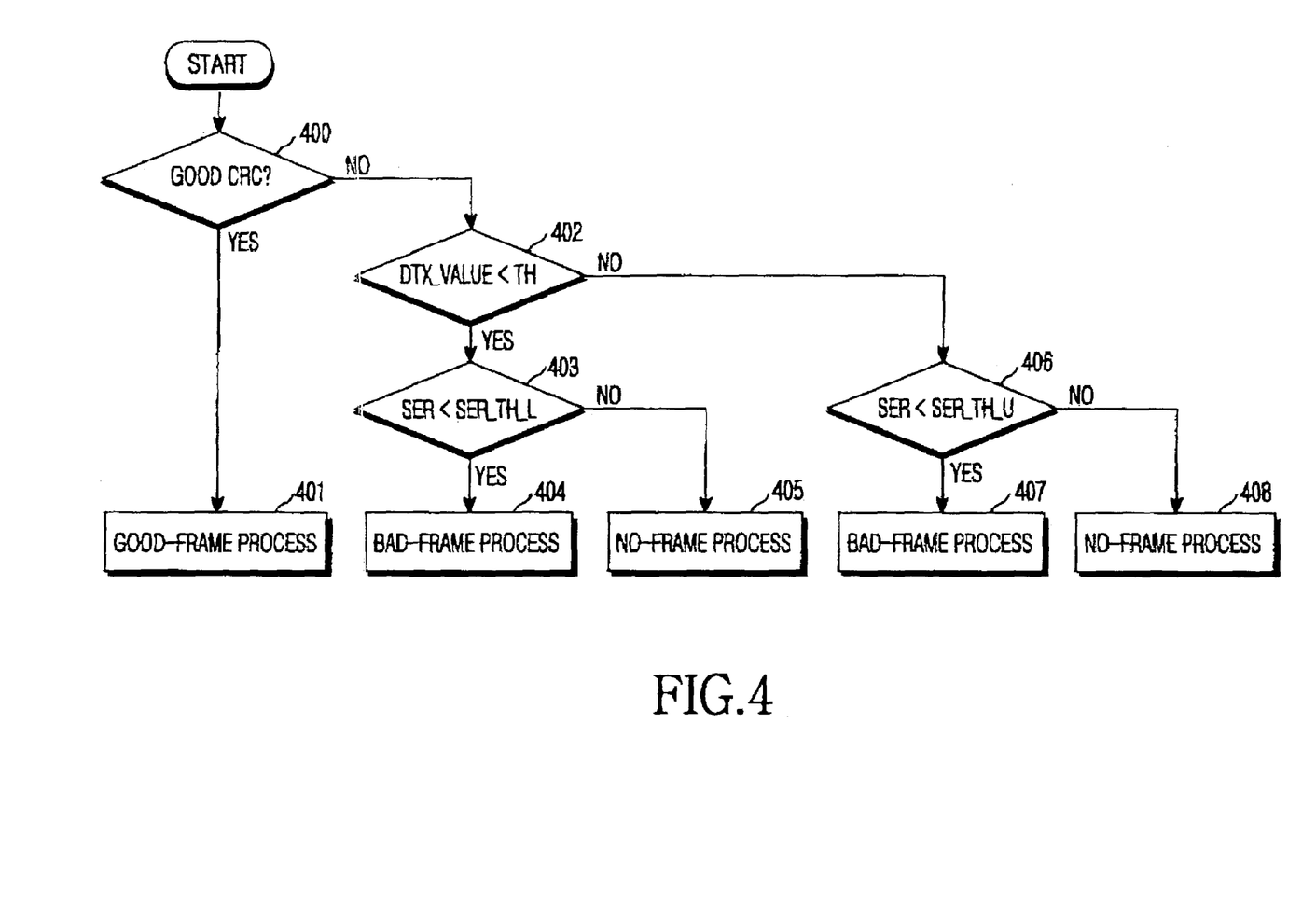
FIG. 4 is a flowchart illustrating an example of a procedure for detecting a discontinuous transmission period in a CDMA mobile communication system in accordance with an embodiment of the present invention.

FIG. 4 is a flowchart illustrating an example of a procedure for detecting a discontinuous transmission period in a CDMA mobile communication system in accordance with an embodiment of the present invention. A detailed description of the first and second frame detection processes will be made with reference to FIGS. 2, 3 and 4.

In step 400 of FIG. 4, the decoder 209 performs a cyclic redundancy code (CRC) check on a received frame comprised of symbols received for a predetermined time period. If the CRC check result of step 400 is "CRC good," the decoder 209 determines that a current period is a frame transmission period and the received frame has no error in step 401, and then provides the determination result to the controller 211 for use in power control. If the CRC check result of step 400 is "CRC bad," the first frame detector 208 compares an SIR DTX_VALUE of a received signal with a predetermined frame detection threshold TH in step 402, to determine the "primary" presence or absence of a frame. As a result of the comparison in step 402, if the DTX_VALUE is smaller than the TH, the SER threshold value selector (SEL) 210c selects the lower SER threshold SER_TH_L 210b and then proceeds to step 403. If the DTX_VALUE is larger than or equal to the TH, the SER threshold value selector (SEL) 210c selects the higher SER threshold SER_TH_U 210a and then proceeds to step 406. In step 402, if the DTX_VALUE is smaller than the TH, the second frame selector 210 selects the lower SER threshold SER_TH_L 210b and then proceeds to step 403. The SER comparator 210d compares the SER from the decoder 209 with the selected SER_TH_L in step 403. As a result of the comparison, if the SER is lower than the SER_TH_L, the SER comparator 210d determines in step 404 that a current period is a frame transmission period and a bad frame is generated. However, if the SER is higher than or equal to the SER_TH_L, the SER comparator 210d determines in step 405 that a current period is a frame non-transmission period, and then provides the determination result to the controller 211.

In step 402, if the DTX_VALUE is larger than or equal to the TH, the second frame selector 210 selects the higher SER threshold SER_TH_U, 210a and proceeds to step 406. The SER comparator 210d compares the SER from the decoder 209 with the selected SER_TH_U in step 406. As a result of the comparison, if the SER is lower than the SER_TH_U, the SER comparator 210d determines in step 407 that a current period is a frame transmission period and a bad frame is generated. However, if the SER is higher than or equal to the SER_TH_U, the SER comparator 210d determines in step 408 that a current period is a frame non-transmission period, and then provides the determination result to the controller 211.

As a result, when it is determined that a bad frame is generated (such as in steps 404 and 407 of FIG. 4), the controller 211 determines that a current channel condition is bad, and increases a threshold for outer loop power control in order to increase power of a received signal. Otherwise, when it is determined that no frame was transmitted (such as in steps 405 and 408), the controller 211 maintains the threshold for outer loop power control.

In a channel environment supporting the discontinuous transmission mode, frame detection is necessarily required. In particular, during power control on a channel, determining the presence or absence of a frame may affect the entire system performance, so it is very important to accurately detect a frame. As described above, in order to detect a frame with no power control bit, the present invention performs first frame detection based on an SIR and second frame detection based on an SER, for completely accurate frame detection. As a result, in a mobile communication channel environment, it is possible to guarantee correct power control even in the discontinuous transmission mode.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for detecting a frame transmission period in a Code Division Multiple Access (CDMA) mobile communication system supporting a discontinuous transmission mode, the apparatus comprising:
a first frame detector, adapted to perform primary frame detection by calculating a signal-to-interference ratio (STIR) using traffic symbol energy, pilot symbol energy and noise energy measured for a predetermined time period, and to compare the SIR with a predetermined frame detection threshold value;
a decoder, adapted to calculate a symbol error rate (SER) by decoding symbols received during the predetermined time period; and
a second frame detector, adapted to select an SER threshold value according to frame detection information from the first frame detector, and to compare the determined SER threshold value with the calculated SER to determine whether a frame has been transmitted.

2. The apparatus of claim 1, wherein the frame detection threshold value is set to an SIR value determined when a traffic channel gain is 0.

3. The apparatus of claim 1, further comprising:
an Radio Frequency (RF) unit, adapted to frequency-down-convert a received RF signal into a baseband signal;
a Pseudo-random Noise (PN) despreader, adapted to despread the baseband signal with a prescribed PN code into a PN-despread signal;
an orthogonal despreader, adapted to despread the PN-despread signal with a prescribed orthogonal code into a orthogonal-despread signal;
a channel estimator, adapted to generate a channel estimation signal by estimating the PN-despread signal;
a mixer, adapted to generate a channel-compensated signal by multiplying the orthogonal-despread signal by the channel estimation signal;
a traffic symbol energy measurer, adapted to measure the traffic symbol energy using the channel-compensated signal, and to provide the measured traffic symbol energy to the first frame detector;
a pilot symbol energy measurer, adapted to measure the pilot symbol energy using the channel estimation signal, and to provide the measured pilot symbol energy to the first frame detector; and
a noise energy measurer, adapted to measure the noise energy using the PN-despread signal, and to provide the measured noise energy to the first frame detector.

4. The apparatus of claim 3, wherein the traffic symbol energy measurer comprises:
  a traffic symbol multipath combiner adapted to generate traffic symbols by combining the channel-compensated signal with signals received through other multiple paths;
  an absolute calculator, adapted to calculate a sum of absolute values of an in-phase component and a quadrature-phase component of the traffic symbols; and
  an accumulator, adapted to generate the traffic symbol energy by accumulating an output of the absolute calculator for the predetermined time period.

5. The apparatus of claim 4, wherein the traffic symbols are provided to the decoder in order to calculate the SER.

6. The apparatus of claim 3, wherein the pilot symbol energy measurer comprises:
  a squarer, adapted to calculate a sum of squares of an in-phase component and a quadrature-phase component of the channel estimation signal;
  a pilot symbol multipath combiner, adapted to generate pilot symbols by combining an output of the squarer with signals received through other multiple paths; and
  an accumulator, adapted to generate the pilot symbol energy by accumulating the pilot symbols for the predetermined time period.

7. The apparatus of claim 1, wherein the SIR is calculated by $$DTX\_VALUE = \frac{E_{symbol}}{E_{noise}} \cdot \frac{\beta}{E_{pilot}}$$

where $E_{symbol}$ denotes the traffic symbol energy, $E_{pilot}$ denotes the pilot symbol energy, $E_{noise}$ denotes the noise energy, and $\beta$ denotes a constant for compensating for a difference between pilot energies.

8. The apparatus of claim 1, wherein if an error check result for the decoded symbols in a frame is good, the predetermined time period is determined as a frame transmission period.

9. The apparatus of claim 1, wherein the second frame detector comprises:
  an SER threshold value selector (SEL), adapted to select a lower SER threshold value out of two predetermined SER threshold values if it is determined from the frame detection information that there exists no frame, and to select a higher SER threshold value if it is determined that there exists a frame; and
  an SER comparator, adapted to compare the selected SER threshold value with the SER to determine whether a frame has been transmitted.

10. The apparatus of claim 1, wherein:
  if the SER is lower than the selected SER threshold value, the predetermined time period is determined as a frame transmission period; and
  if the SER is higher than or equal to the selected SER threshold value, the predetermined time period is determined as a frame non-transmission period.

11. A method for detecting a frame transmission period in a Code Division Multiple Access (CDMA) mobile communication system supporting a discontinuous transmission mode, the method comprising the steps of:
  performing primary frame detection at a first frame detector to generate frame detection information by calculating a signal-to-interference ratio (SIR) using traffic symbol energy, pilot symbol energy and noise energy measured for a predetermined time period, and comparing the SIR with a predetermined frame detection threshold value;
  calculating a symbol error rate (SER) by decoding symbols received for the predetermined time period; and
  performing secondary frame detection at a second frame detector by selecting an SER threshold value according to the frame detection information, and comparing the selected SER threshold value with the SER to determine whether a frame has been transmitted.

12. The method of claim 11, wherein the frame detection threshold value is set to an SIR determined when a traffic channel gain is 0.

13. The method of claim 11, further comprising the steps of:
  frequency-down-converting a received RF signal into a baseband signal;
  despreading the baseband signal with a prescribed PN code into a PN-despread signal;
  despreading the PN-despread signal with a prescribed orthogonal code into a orthogonal-despread signal;
  generating a channel estimation signal by estimating the PN-despread signal;
  generating a channel-compensated signal by multiplying the orthogonal-despread signal by the channel estimation signal;
  measuring the traffic symbol energy using the channel-compensated signal;
  measuring the pilot symbol energy using the channel estimation signal; and
  measuring the noise energy using the PN-despread signal.

14. The method of claim 13, wherein the traffic symbol energy measuring step comprises the steps of:
  generating traffic symbols by combining the channel-compensated signal with signals received through other multiple paths;
  calculating a sum of absolute values of an in-phase component and a quadrature-phase component of the traffic symbols; and
  generating the traffic symbol energy by accumulating the sum of the absolute values for the predetermined time period.

15. The method of claim 14, wherein the traffic symbols are used to calculate the SER.

16. The method of claim 13, wherein the pilot symbol energy measuring step comprises the steps of:
  calculating a sum of squares of an in-phase component and a quadrature-phase component of the channel estimation signal;
  generating pilot symbols by combining an output of the squarer with signals received through other multiple paths; and
  generating the pilot symbol energy by accumulating the pilot symbols for the predetermined time period.

17. The method of claim 11, wherein the SIR is calculated by $$DTX\_VALUE = \frac{E_{symbol}}{E_{noise}} \cdot \frac{\beta}{E_{pilot}}$$

where $E_{symbol}$ denotes the traffic symbol energy, $E_{pilot}$ denotes the pilot symbol energy, $E_{noise}$ denotes the noise energy, and $\beta$ denotes a constant for compensating for a difference between pilot energies.

18. The method of claim 11, wherein if an error check result for the decoded symbols in a frame is good, the predetermined time period is determined as a frame transmission period.

19. The method of claim 11, wherein the determining step whether a frame has been transmitted comprises the steps of:
selecting a lower SER threshold value out of two predetermined SER threshold values if it is determined from the frame detection information that there exists no frame, and selecting a higher SER threshold value if it is determined that there exists a frame; and comparing the selected SER threshold value with the SER to determine whether a frame has been transmitted.

20. The method of claim 11, wherein if the SER is lower than the selected SER threshold value, the predetermined time period is determined as a frame transmission period, and if the SER is higher than or equal to the selected SER threshold value, the predetermined time period is determined as a frame non- transmission period.

* * * * *